United States Patent
Mao et al.

(10) Patent No.: US 7,462,498 B2
(45) Date of Patent: Dec. 9, 2008

(54) ACTIVATION OF CARBON NANOTUBES FOR FIELD EMISSION APPLICATIONS

(75) Inventors: Dongsheng Mao, Austin, TX (US); Richard Fink, Austin, TX (US); Zvi Yaniv, Austin, TX (US)

(73) Assignee: Applied Nanotech Holdings, Inc., Austin, TX (US)

( * ) Notice: Subject to any disclaimer, the term of this patent is extended or adjusted under 35 U.S.C. 154(b) by 0 days.

(21) Appl. No.: 11/156,972

(22) Filed: Jun. 20, 2005

(65) Prior Publication Data

US 2005/0244991 A1    Nov. 3, 2005

Related U.S. Application Data

(63) Continuation-in-part of application No. 10/269,577, filed on Oct. 11, 2002, now Pat. No. 7,195,938.

(60) Provisional application No. 60/585,771, filed on Jul. 6, 2004, provisional application No. 60/343,642, filed on Oct. 19, 2001, provisional application No. 60/348,856, filed on Jan. 15, 2002, provisional application No. 60/369,794, filed on Apr. 4, 2002.

(51) Int. Cl.
*H01L 51/40* (2006.01)

(52) U.S. Cl. .................... 438/20; 438/99; 977/855; 977/857; 977/858; 977/859; 977/888

(58) Field of Classification Search .......... 438/20, 438/22, 99; 977/742, 745, 859, 855, 857, 977/858, 888; 445/50, 51; 156/247; 313/310
See application file for complete search history.

(56) References Cited

U.S. PATENT DOCUMENTS

| | | | |
|---|---|---|---|
| 5,726,524 A | * | 3/1998 | Debe ..................... 313/309 |
| 5,981,305 A | | 11/1999 | Hattori |
| 6,057,636 A | | 5/2000 | Sakai et al. |
| 6,057,637 A | * | 5/2000 | Zettl et al. ............... 313/310 |
| 6,097,138 A | * | 8/2000 | Nakamoto ............... 313/309 |
| 6,239,547 B1 | * | 5/2001 | Uemura et al. ........... 313/495 |
| 6,286,226 B1 | * | 9/2001 | Jin .......................... 33/706 |
| 6,436,221 B1 | | 8/2002 | Chang et al. ............. 156/247 |
| 6,713,947 B2 | * | 3/2004 | Hirasawa et al. ......... 313/313 |
| 6,766,566 B2 | * | 7/2004 | Cheng et al. .............. 24/452 |
| 7,040,948 B2 | * | 5/2006 | Mao et al. ................. 445/25 |
| 7,105,200 B2 | * | 9/2006 | Sakamoto et al. ........ 427/203 |

(Continued)

FOREIGN PATENT DOCUMENTS

WO   WO 01/92150   6/2001

OTHER PUBLICATIONS

Yang-Doo Lee et al., "53.2: Characteristics of Field Emission from Printed Carbon Nanotubes by Physical Surface Treatments," *SID 05 Digest*, 2005, pp. 1617-1619.

(Continued)

*Primary Examiner*—M. Wilczewski
(74) *Attorney, Agent, or Firm*—Fish & Richardson P.C.; Kelly K. Kordzik

(57) ABSTRACT

Substantially enhanced field emission properties are achieved by using a process of covering a non-adhesive material (for example, paper, foam sheet, or roller) over the surface of the CNTs, pressing the material using a certain force, and removing the material.

7 Claims, 14 Drawing Sheets

U.S. PATENT DOCUMENTS

| | | | |
|---|---|---|---|
| 7,125,308 B2* | 10/2006 | Fink | 445/51 |
| 7,132,161 B2* | 11/2006 | Knowles et al. | 428/364 |
| 2003/0092207 A1* | 5/2003 | Yaniv et al. | 438/20 |
| 2004/0104660 A1* | 6/2004 | Okamoto et al. | 313/346 R |
| 2004/0166235 A1* | 8/2004 | Fujii et al. | 427/77 |
| 2004/0191698 A1* | 9/2004 | Yagi et al. | 430/320 |
| 2004/0206448 A1* | 10/2004 | Dubrow | 156/276 |
| 2004/0224081 A1* | 11/2004 | Sheu et al. | 427/58 |
| 2005/0062024 A1* | 3/2005 | Bessette et al. | 252/500 |
| 2006/0188721 A1* | 8/2006 | Irvin et al. | 428/402 |

OTHER PUBLICATIONS

Jihua Zhang et al., "Enhancement of field emission from hydrogen plasma processed carbon nanotubes," *Diamond and Related Materials*, 13 (2004), pp. 54-59.

D.S. Chung et al., "Field emission from 4.5 in. single-walled and multiwalled carbon nanotube films," *J. Vac. Sci. Technol. B*, vol. 18, No. 2, Mar./Apr. 2000, pp. 1054-1058.

T.J. Vink et al., "Enhanced field emission from printed carbon nanotubes by mechanical surface modification," *Appl. Phys. Lett.*, vol. 83, No. 17, Oct. 27, 2003, pp. 3552-3554.

W.J. Zhan et al., "Field emission from screen-printed carbon nanotubes irradiated by tunable ultraviolet laser in different atmospheres," *J. Vac. Sci. Technol. B*, vol. 21, No. 4, Jul./Aug. 2003, pp. 1734-1737.

Z.F. Ren et al., "Synthesis of Large Arrays of Well-Aligned Carbon Nanotubes on Glass," *Science*, vol. 282, Nov. 6, 1998, pp. 1105-1107.

Won Seok Kim et al., "Secondary electron emission from magnesium oxide on multiwalled carbon nanotubes," *Appl. Phys. Lett.*, vol. 81, No. 6, Aug. 5, 2002, pp. 1098-1100.

Walt A. de Heer, "Nanotubes and the Pursuit of Applications," *MRS Bulletin*, Apr. 2004, pp. 281-285.

Jihua Zhang, "Enhancement of field emission from hydrogen plasma processed carbon nanotubes," ScienceDirect-Diamond and Related Materials, vol. 13, Issue 1, Jan. 2004, Abstract, pp. 1-2 (printed from Internet at http://www.sciencedirect.com/science).

D.S. Mao et al., New CNT composites for FEDs that do not require activation, 9th International Display Workshops, Dec. 2002, Hiroshima, Japan, pp. 1-2.

Zvi Yaniv, "The Status of the Carbon Electron Emitting films for Display and Microelectronic Applications," International Display Manufacturing Conference, Jan. 2002, Seoul, Korea, pp. 1-6.

* cited by examiner

ACTIVATION OF CARBON NANOTUBES FOR FIELD EMISSION APPLICATIONS

This application claims priority to U.S. Provisional Application Ser. No. 60/585,771. This application is a continuation-in-part of U.S. patent application Ser. No. 10/269,577, which claims benefit to U.S. Provisional Applications Nos. 60/343,642; 60/348,856; and 60/369,794, which are all hereby incorporated by reference herein.

TECHNICAL FIELD

The present invention relates in general to field emitters, and in particular, to field emitters utilizing carbon nanotubes

BACKGROUND INFORMATION

Carbon nanotubes (CNTs) are being investigated by a number of companies and institutions because of their unbelievable physical, chemical, electronical, and mechanical properties (Walt A. de Heer, "Nanotubes and the Pursuit of Applications," MRS Bulletin 29(4), pp. 281-285 (2004)). They can be used as excellent cold electron sources for many applications such as displays, microwave sources, x-ray tubes, etc., because of their excellent field emission properties and chemical inertness for very stable and low voltage operation with long lifetime (Zvi Yaniv, "The status of the carbon electron emitting films for display and microelectronic applications," The International Display Manufacturing Conference, Jan. 29-31, 2002, Seoul, Korea). Aligned carbon nanotubes have been demonstrated to have excellent field emission properties, which can be made by chemical vapor deposition (CVD) on a catalyst-supported substrate at over 500° C. (Z. F. Ren, Z. P. Huang, J. W. Xu et al., "Synthesis of large arrays of well-aligned carbon nanotubes on glass," Science 282, pp. 1105-1107 (1998)). But the CVD process is not a good way to grow CNTs over large areas because it is very difficult to achieve high uniformity required for display applications. CVD growth of CNTs also requires a high process temperature (over 500° C.), eliminating the use of low-cost substrates such as soda-lime glass.

An easier process is to collect the CNT powders and uniformly deposit them onto selective area of the substrates. CNTs can be printed through a mesh screen if they are mixed with a binder, and epoxy, etc. (D. S. Chung, W. B. Choi, J. H. Kang et al., "Field emission from 4.5 in. single-walled and multiwalled carbon nanotube films," J. Vac. Sci. Technol. B18(2), pp. 1054-1058 (2000)). CNT's can be sprayed onto the substrates if mixed with a solvent such as IPA, acetone, or water (D. S. Mao, R. L. Fink, G. Monty et al., "New CNT composites for FEDs that do not require activation," Proceedings of the Ninth International Display Workshops, Hiroshima, Japan, p. 1415, Dec. 4-6, 2002). Special surface treatments are then often needed to achieve low electric field emission and high emission site density of the CNT cathodes. Hydrogen plasma etching (Jihua Zhang, Tao Feng, Weidong Yu et al., "Enhancement of field emission from hydrogen plasma processed carbon nanotubes," Diamond and Related Materials 13, pp. 54-59 (2004)), ultraviolet laser irradiation (W. J. Zhao, N. Kawakami, A. Sawada et al., J. Vac. Sci. Technol. B21(4), pp. 1734-1736 (2003)), Magnesium oxide thin-film deposition at the top of the CNT layer (Won Seok Kim, Whikun Yi, SeGi Yu, et al., "Secondary electron emission from magnesium oxide on multiwalled carbon nanotubes," Appl. Phys. Lett. 81(6), pp. 1098-2000 (2002)) are effective ways to improve field emission from of the CNTs. But none of them can be processed on large areas uniformly.

A taping process seems to be an attractive way to enhance the field emission properties of the carbon nanotubes (Yu-Yang Chang, Jyh-Rong Sheu, Cheng-Chung Lee, "Method of improving field emission efficiency for fabricating carbon nanotube field emitters," U.S. Pat. No. 6,436,221). In this method, an adhesive tape is closely attached on the CNT cathode substrate and then it is removed. Some carbon nanotubes will be vertically oriented, and those poorly bonded CNT portions will be removed. It is highly possible that some adhesive residue will remain on the substrate and the top of the carbon nanotube layer. The organic residue on the substrate after the taping activation process may give off undesirable residual gases in the sealed glass display envelope during field emission operation. Furthermore, it is difficult to uniformly activate the substrate over large areas. For example, many display applications may require 40-100 inch diagonal plates. All of these problems obviously obstruct the various field emission applications of CNTs.

SUMMARY OF THE INVENTION

Substantially enhanced field emission properties were achieved by using a process as follows:

1. Covering a non-adhesive material (for example, paper, foam sheet, or roller) over the surface of the CNTs.
2. Pressing the material using a certain force.
3. Removing the material.

Unlike the adhesive tape activation process, the present invention does not remove significant amounts of the CNTs, but flattens and creates a new structure for the CNT layer. The blanket sheet used in this invention is non-adhesive, and therefore there is no organic residue remaining on the substrate. This method was compared with the taping process and much better field emission properties of the CNTs were achieved. This process has several advantages:

1. Very easy and low cost way to process.
2. The process can be done on very large areas with very good uniformity.
3. No residue remains on the substrate after the process.

The foregoing has outlined rather broadly the features and technical advantages of the invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
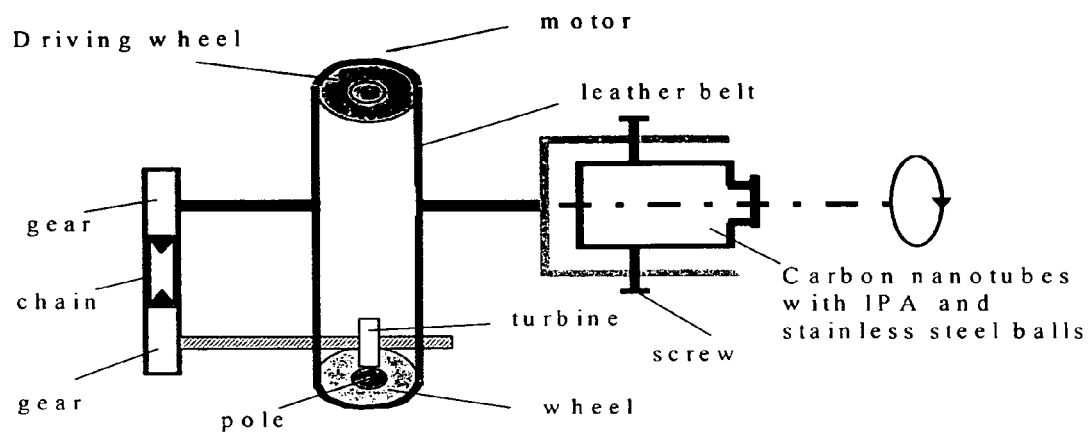
FIG. 1 illustrates a schematic diagram of a ball mill.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

1. Source of Carbon Nanotube and Alumina Powders

Used for creating samples for the present invention were unpurified single wall carbon nanotubes (SWNTs) from CarboLex, Inc., Lexington, Ky., USA and purified SWNTs from Carbon Nanotechnologies, Inc., Houston, Tex., USA. These SWNTs were 1~2 nm in diameter and 5~20 µm in length. Both purified and unpurified single wall, double-wall or multiwall carbon nanotubes, carbon fibers or other kinds of nanotubes and nanowires from other venders can also be used with similar results.

2. Preparation of the Mixture of Carbon Nanotubes Coating on the Substrate

1) Grinding of SWNTs

A ball mill was used to grind both unpurified and purified SWNT bundles. FIG. 1 is a schematic diagram of such a ball mill. The rate of this machine is about 50~60 revolutions per minute. In this method, 1 g SWNTs as well as 100 stainless steel balls used for grinding (5 mm in diameter) were mixed with 200~300 ml IPA (isopropyl alcohol). The material was ground for 1~14 days in order to disperse the carbon nanotubes. A surfactant or similar material can also be added to the mixture in order to achieve better dispersion of the carbon nanotubes.

2) Spray the Mixture on the Substrates

Figure 2:
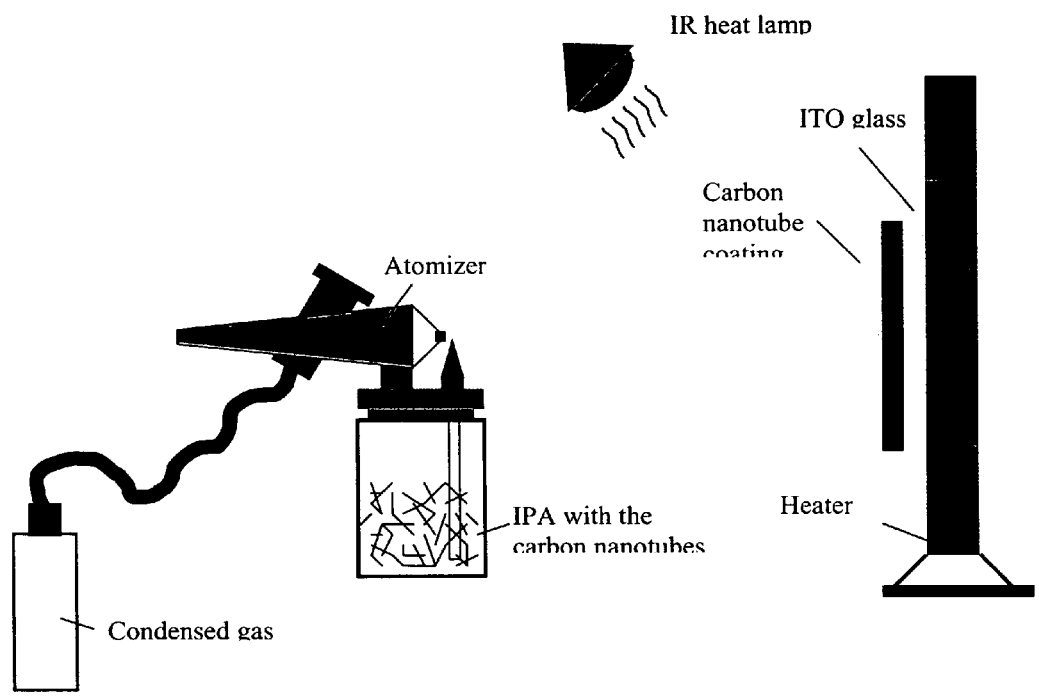
FIG. 2 is a schematic diagram of a spray process.

A spray process to deposit the CNTs onto the substrate may be used. FIG. 2 is a schematic diagram of such a spray process. Because CNTs easily clump together when grinding or stirring is stopped, an ultrasonic horn or bath is used to disperse them again in an IPA solution before spraying them onto the substrates. The CNT-IPA solution may be sprayed onto a conductive ITO/glass. The CNT solution may be sprayed onto the substrate with an area of 2×2 cm$^2$. The solution can also be sprayed on various other substrates such as metal, ceramic, glass, semiconductors and plastics. In order to achieve better coating uniformity and dispersion on the substrates, more IPA can be added into the above solution before spraying. The solution for spraying may be about a 0.2 g mixture in 1000 ml IPA. The CNTs can also be sprayed on selective areas by using a shadow mask. In order to prevent the IPA from flowing to unexpected areas, the substrates may be heated up to ~70° C. both on the front side and back side during the spray process to evaporate the IPA more quickly. The substrate may be sprayed back and forth or up and down several to tens of times until the entire surface is coated with the CNTs. The thickness of the mixture may be about 2~20 µm. Then they may be dried in air, naturally.

Other processes instead of spraying may be used to coat the mixture on the surface, such as electrophoresis deposition, dipping, screen-printing, ink-jet printing, dispensing, spin-coating, brushing or any other techniques that can deposit this mixture onto the substrates. Other solvents such as acetone or methanol may also be used as the carrier for spraying the CNTs.

3. Activation

Figure 3:
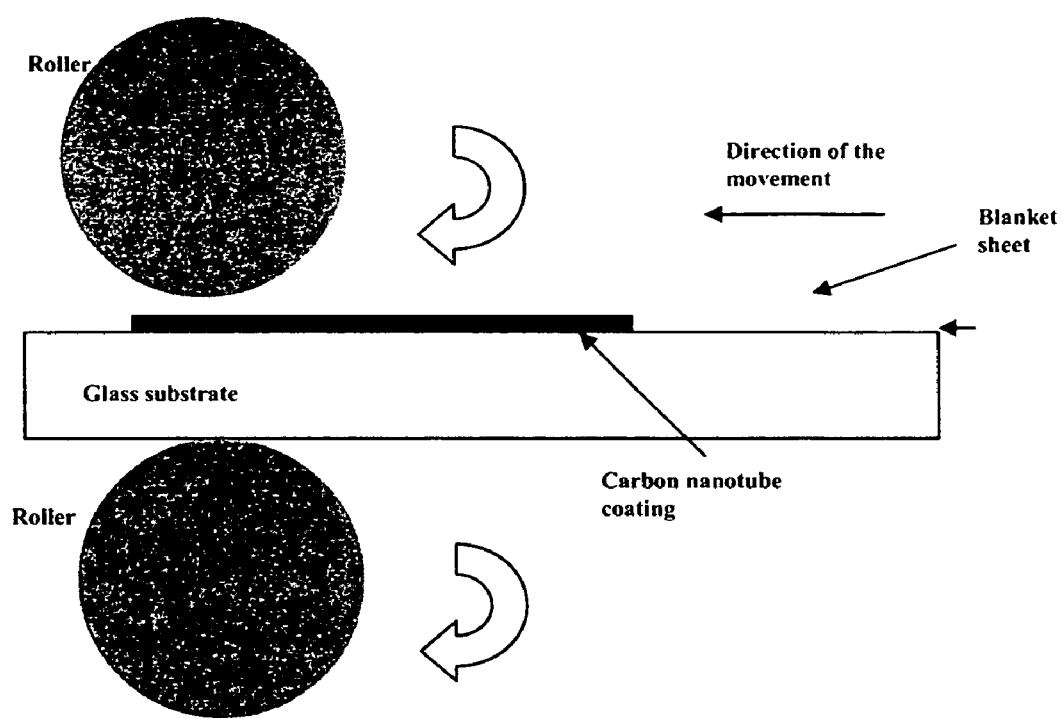
FIG. 3 is a schematic diagram of a laminating process.

After the CNTs are deposited (coated) onto the surface of the substrate, a process of "activating" the CNT film by applying a blanket sheet onto the surface of the CNT film is utilized. FIG. 3 shows a schematic diagram of the process. Both a 100 microns thick paper (made by IMPRESO) and a 3 mm thick funky foam sheet (4KIDS Company, MFG. LTD, made in China, item #CS 97017) were used. The non-adhesive material can be either flexible or non-flexible, comprising hard or soft materials such as an elastic foam sheet, paper, metal, ceramic or glass plate. It can be either a blanket sheet or a material in round shapes such as polymer and wood rollers or other regular or irregular shapes.

The blanket sheet may be adhered on the carbon nanotube coating using a laminating process. The laminate contains two vertically touched rollers. When the substrate is run through the gap between the two rollers from one side to the other side, a force will be pressed onto the CNT coating between the blanket sheet and the substrate by these two rollers. Then, the blanket sheet is peeled away. Samples were made to compare this process to the taping process to activate the CNTs (Yang Chang, Jyh-Rong Sheu, Cheng-Chung Lee, Industrial Technology Research Institute, Hsinchu, T W, "Method of Improving Field Emission Efficiency for Fabrication Carbon Nanotube Field Emitters," U.S. Pat. No. 6,436,221). Clear tape (Catalog number #336, 3M) may be also used to active the CNTs. The tape may be adhered on the coating using the same laminating process. Care may be taken to ensure that there is no air between the tape and the CNT coating. If a bubble exists, the mixture at that area will not be removed or treated as the other areas are. A rubber roll may be used to further press the tape in order to prevent air in the intersection between the tape and the CNT coating. Finally, the tape may be peeled away.

4. Field Emission Test of the Samples

Figure 4:
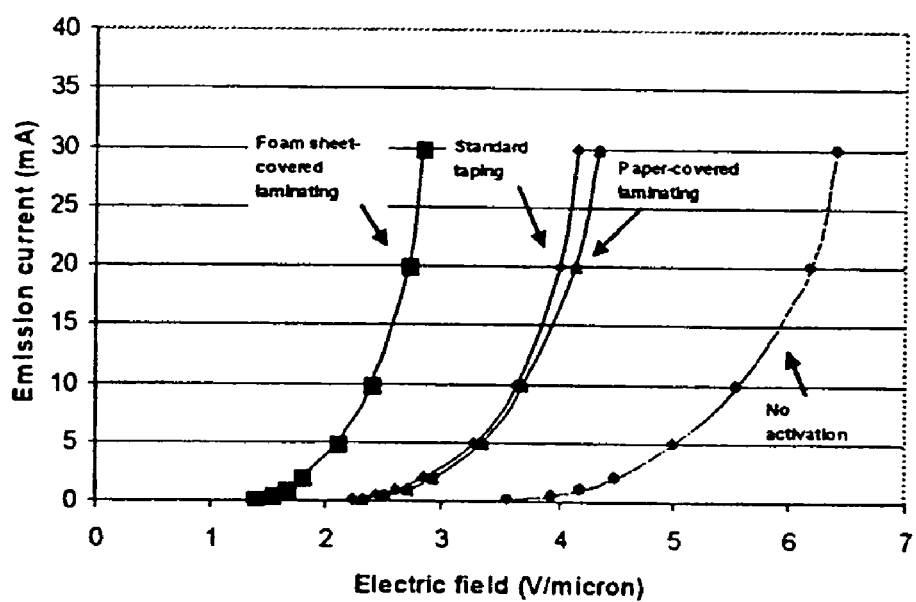
FIG. 4 illustrates a graph of field emission current versus electric field curves for samples created using an embodiment of the present invention.

To compare field emission properties, all the samples (activated by taping, paper-covered laminating, foam sheet-covered laminating, and non-activated) were tested using the same way. They were tested by mounting them with a phosphor screen in a diode configuration with a gap of about 0.63 mm between the anode and cathode. The test assembly was placed in a vacuum chamber and pumped to 10$^{-7}$ Torr. The electrical properties of the cathode were then measured by applying a negative, pulsed voltage (AC) to the cathode and holding the anode at a ground potential and measuring the current at the anode. A DC potential could also be used for the testing, but this may damage the phosphor screen. A graph of the emission current vs. electric field for the samples is shown in FIG. 4.

It can be seen that the sample activated by the foam sheet-covered laminating process has the best field emission properties. The taping process has very similar results with the paper-covered laminating process. The sample with no activation process had the worst field emission properties.

Figure 5:
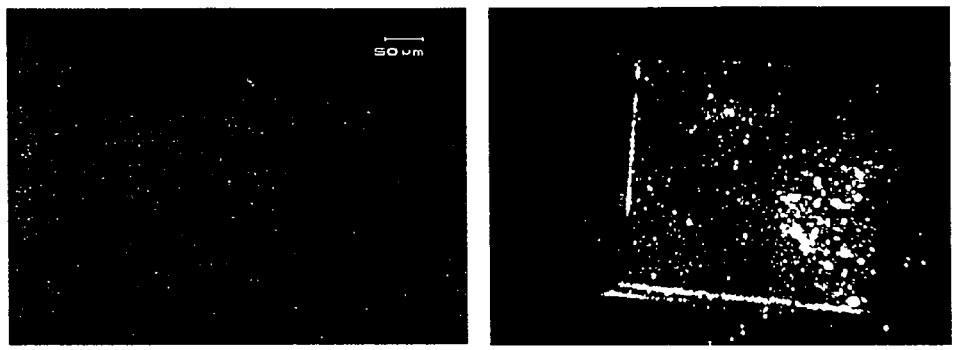
FIG. 5 illustrates microscopy images of non-activated CNT coatings.

FIG. 5 shows micro-optical microscopy images of the CNT coatings of the samples as well as their field emission images (30 ma at 6.27 V/micron). For the non-activated CNT coating, the CNT coating was continuous. As seen in the optical microscope, the surface of this sample was not flat. The thickness varied from 5 microns to 20 microns. The higher protrusions on the surface may contain non-dispersed CNT clusters. Its field emission site density was very low. The very dense CNTs may cause electric field shielding problems and prevent the electrons from being extracted from the CNTs. Because the higher protrusions have the higher geometric field enhancement, they can prematurely emit electrons, causing non-uniformity of the field emission.

Figure 6:
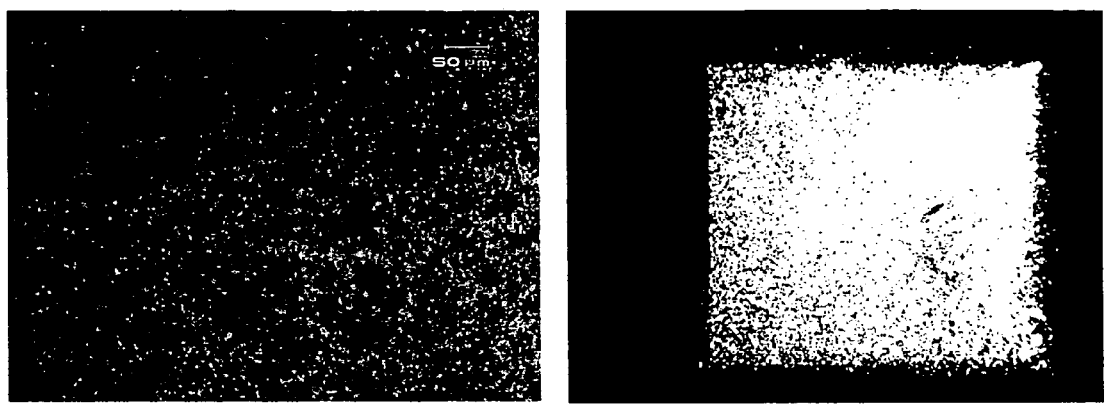
FIG. 6 illustrates microscopy images of tape activated CNT coatings.

After the CNT coating was activated by the taping process, its thickness was 2-5 microns thick but the coating was still continuous, as shown in FIG. 6 (field emission image of 30 mA at 4.16 V/micron). It indicated that the majority of the CNT materials were removed by the tape. It has better field emission properties than the non-activated sample because some CNTs have been vertically aligned (T. J. Vink, M. Gillies, J. C. Kriege et al., "Enhanced field emission from printed carbon nanotubes by mechanical surface modification," Appl. Phys. Lett 83(17), pp. 3552-3554 (2003)).

Figure 7:
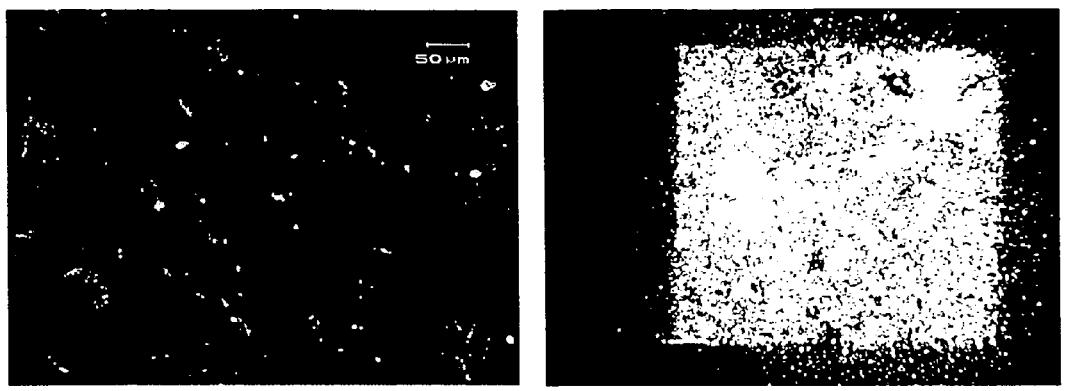
FIG. 7 illustrates microscopy images of CNT coatings activated with paper covering.
Figure 8:
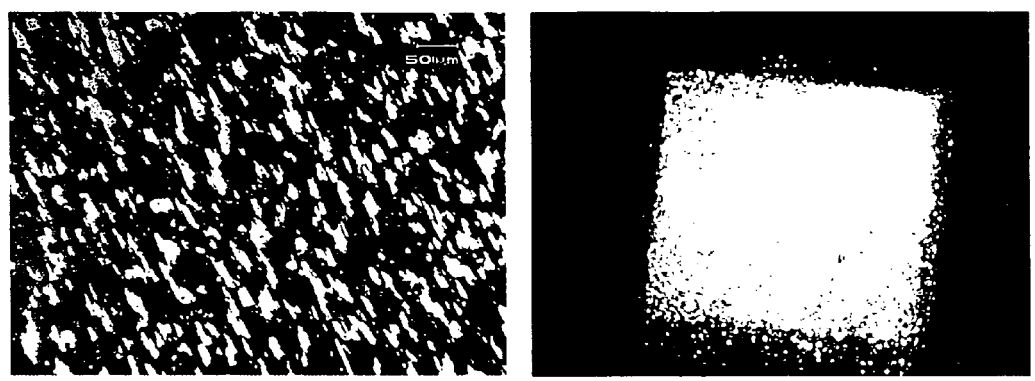
FIG. 8 illustrates microscopy images of a CNT coating activated with a foam sheet lamination process.

As compared with non-activated and taped samples, both foam sheet-covered (FIG. 8) and paper-covered laminated (FIG. 7) samples had bright dots where the surface of the ITO/glass substrate could be seen. The CNTs from these areas were moved to other areas of the CNT layer or removed with the sheets, as shown in FIGS. 7 and 8. The density of the bright dots for the foam sheet-covered laminating sample (field emission image taken at 30 mA at 2.82 V/micron) is much higher than that of the paper-covered laminating sample (field emission image taken at 30 mA at 2.82 V/micron). The CNT clusters are nearly separated from each other. This kind of structure can substantially decrease the effect of electric field shielding among the CNTs. The thicknesses of these two samples were about 5-6 microns. The CNT coatings were much flatter than non-activated samples. So, the electric field distribution of the CNT protrusions would be well-balanced, causing much better uniformity of the field emission. Both the sheet-covered samples had very high emission site density. Field emission of the 3 mm-thick foam sheet-cover activated sample is even much better than that of the tape-activated sample (2.82 V/micron at 30 mA compared with 4.16 V/micron for tape-activated sample, 35% lower). The different field emission results between foam sheet-covered and paper-covered process may be because of the different thick and surface microstructures of them. Different thickness and the different microstructures of the blanket sheet may obtain even better field emission properties of the CNTs.

Figure 9:
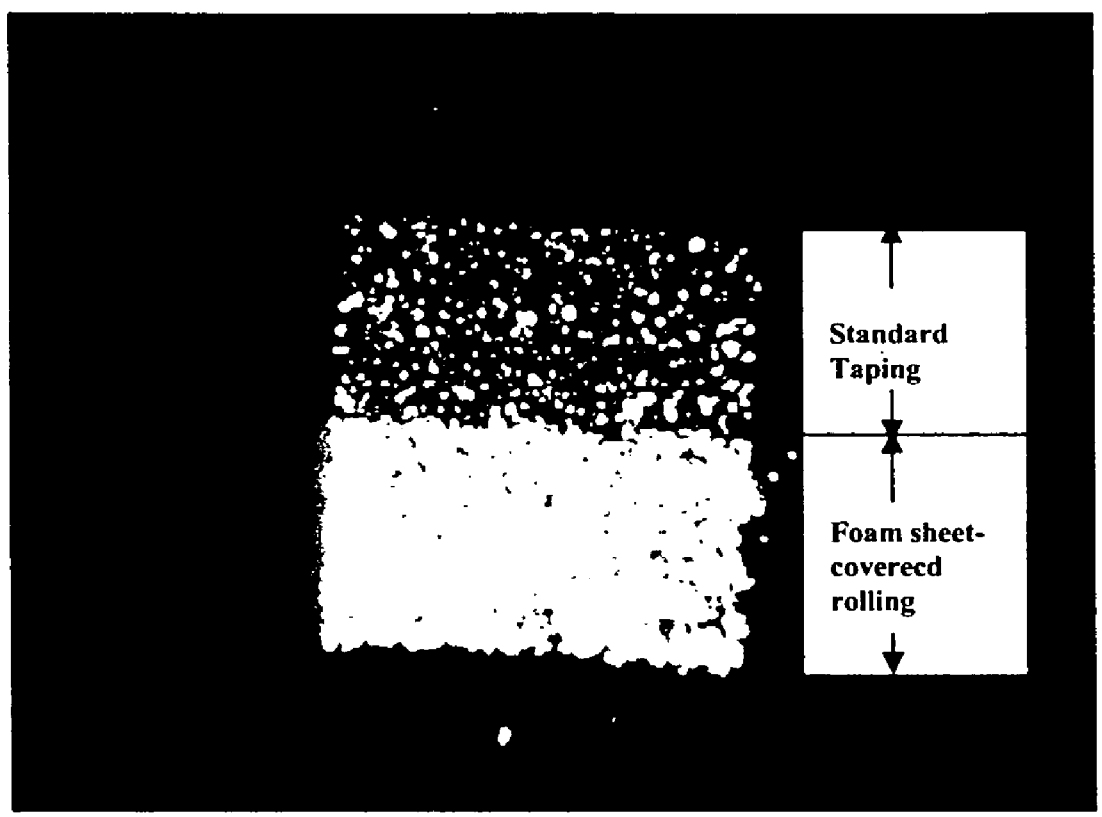
FIG. 9 illustrates a field emission image of a sample at 30 mA of emission current.

An experiment was also done to further confirm the much better field emission of the CNT coatings by the foam sheet-covered laminating process than by the taping process. The half area of the above non-activated sample was activated by a taping process whereas the other half area was activated by the foam sheet-covered laminating process. FIG. 9 is the field emission image of the sample. It can be seen that the bottom half has much higher brightness and emission site density where it was activated by the foam sheet-covered laminating process.

5. Blanket Sheet-covered Laminating Process on Larger Area

Figure 10:
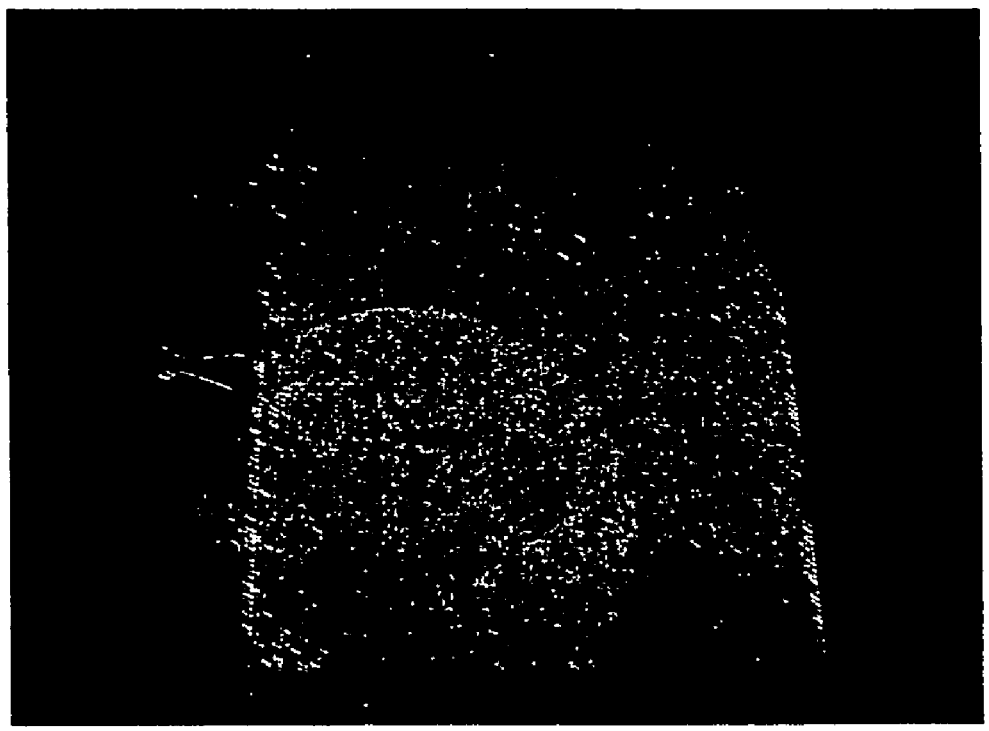
FIG. 10 illustrates a field emission image of a sample created in accordance with an embodiment of the present invention.
Figure 11:
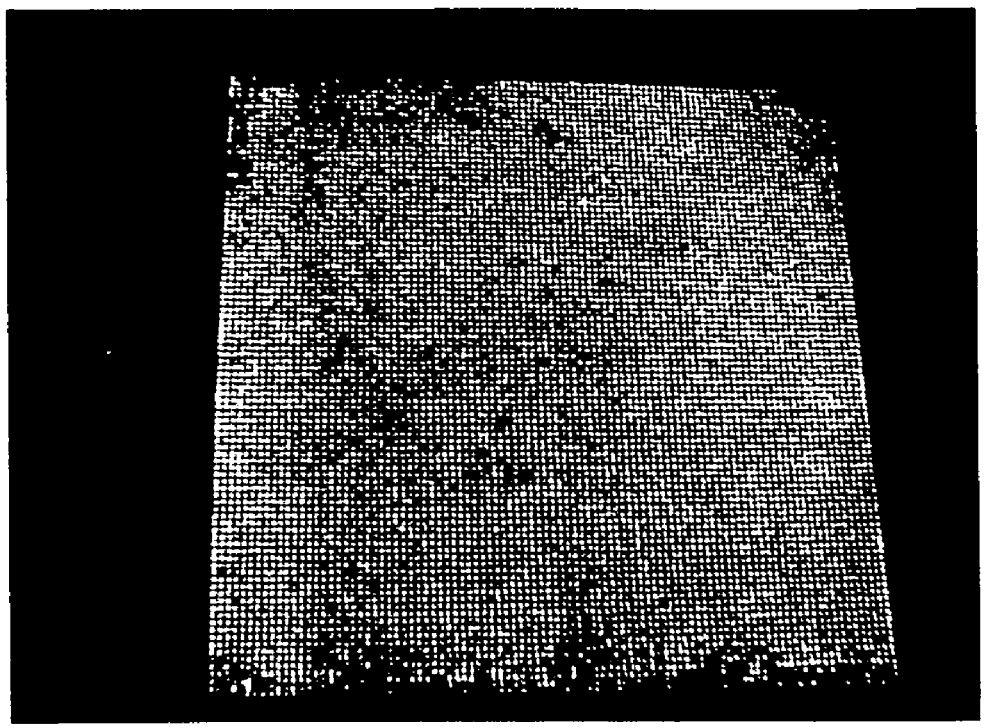
FIG. 11 illustrates a field emission image of a sample.

The above experiment was focused on a 2 cm×2 cm area CNT coating. The CNTs were also sprayed onto a larger area ITO/glass substrate (10 inch by 10 inch) using a shadow mask. CarboLex unpurified SWNTs were used. The size of every opening was 1.3 mm×1.3 mm. The size of the pitch was 2.5 mm. The gap between openings was 1.2 mm. The amount of the openings was 96×96 pixels. During the spray process, the mask was stuck onto the ITO/glass and CNTs were deposited onto the substrate through the openings on the mask. Then, the sample was activated by a 3 mm thick foam sheet-covered laminating process as used above. FIGS. 10 and 11 are field emission images of the sample at different electric fields (2.21 V/micron and 2.67 V/micron, respectively). It can be seen that the field emission uniformity on the whole 14 inch diagonal was excellent. Field emission was very uniform at low voltage (less than 3 V/micron). The defects in FIG. 11 might be because of the bad anode phosphor anode plate. An even bigger substrate can be processed (for example, 40 inch diagonal or more).

Figure 12:
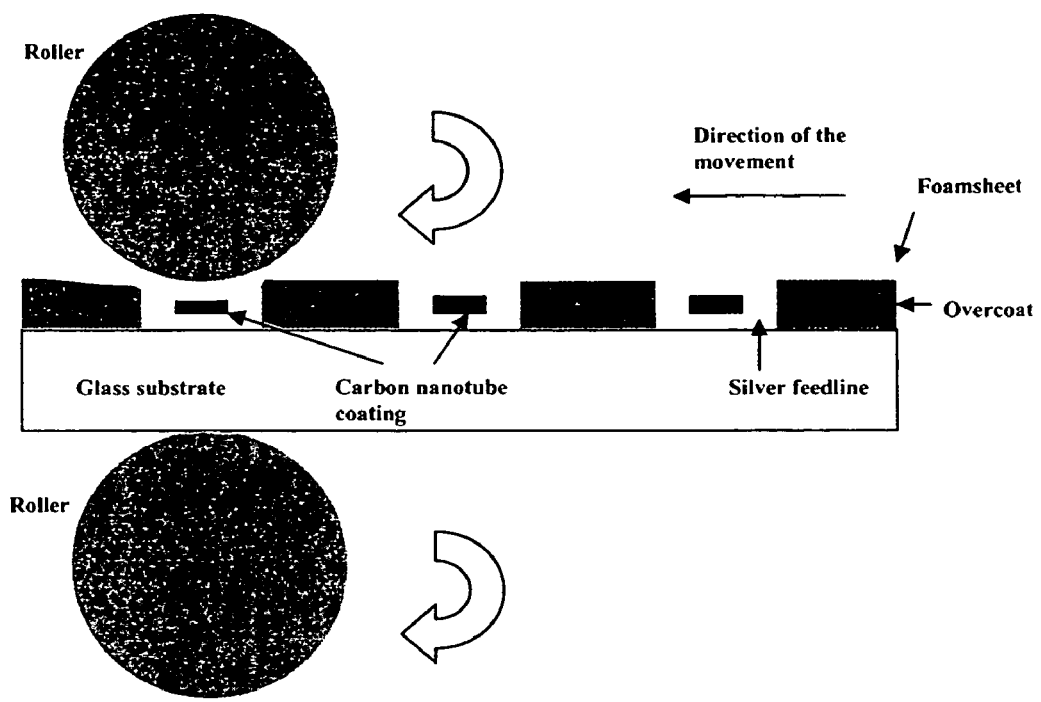
FIG. 12 illustrates a schematic diagram of a structured substrate under a laminating process in accordance with an embodiment of the present invention.

6. Blanket Sheet-covered Laminating Process on Larger Area Substrate with Patterned Structure All the above experiments were processed on the blanket CNT substrate. For the CNT cold cathode device, one may use a triode structure in order to lower the extract voltage and the cost. Purified SWNTs purchased from Carbon Nanotechnologies, Inc. were used. A CNT coating was sprayed onto the substrate with the patterned structure. A schematic diagram of the substrate can be seen in FIG. 12. First, 6 micron-thick silver paste electrodes were screen-printed on the glass substrate. Then a 50 micron-thick insulating overcoat was printed leaving the small openings of the silver electrode on the surface (size of the openings: 300 micron×800 micron). The number of the openings on the substrate was 288×288 pixels. The total CNT active area was 10 inch by 10 inch. The CNTs were sprayed into the openings using a shadow mask. The size of the openings on the shadow mask was 200 micron× 650 micron so that the CNT coating was smaller than the opening of the substrate. The overcoat on the substrate was 30-40 microns higher than the CNT coating. Two samples were made and they were activated by the taping and foam sheet-covered laminating processes, respectively. Both the tape and the foam were elastic enough to be pressed onto the CNT coatings (See FIG. 12).

Figure 13:
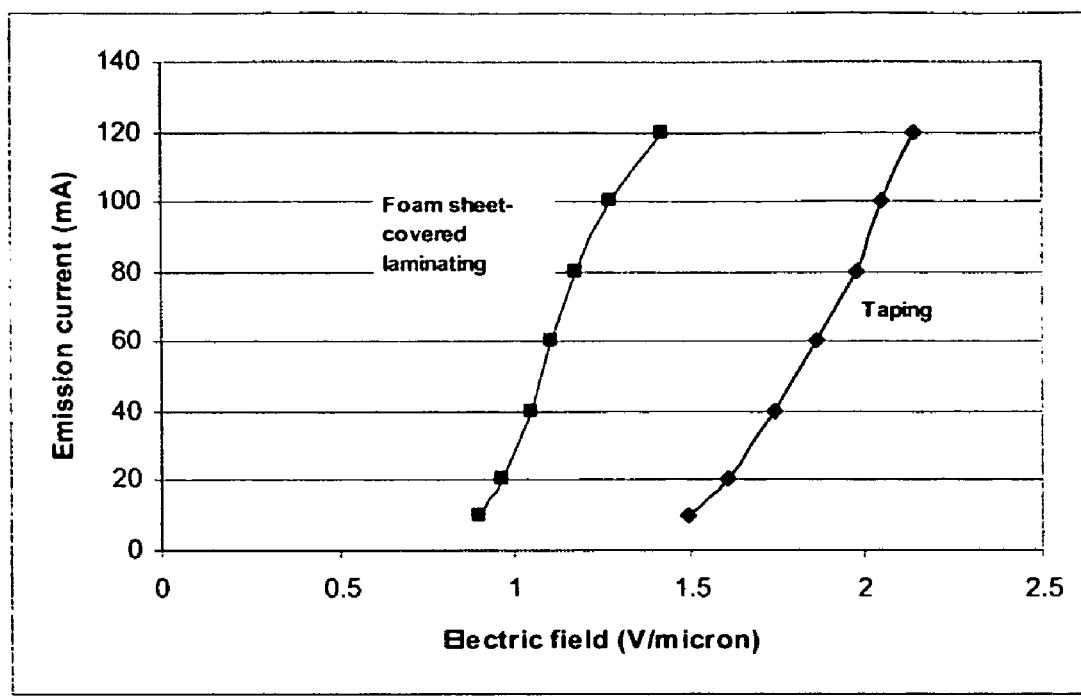
FIG. 13 illustrates a graph of field emission current versus electric field curves for samples created using embodiments of the present invention.
Figure 14:
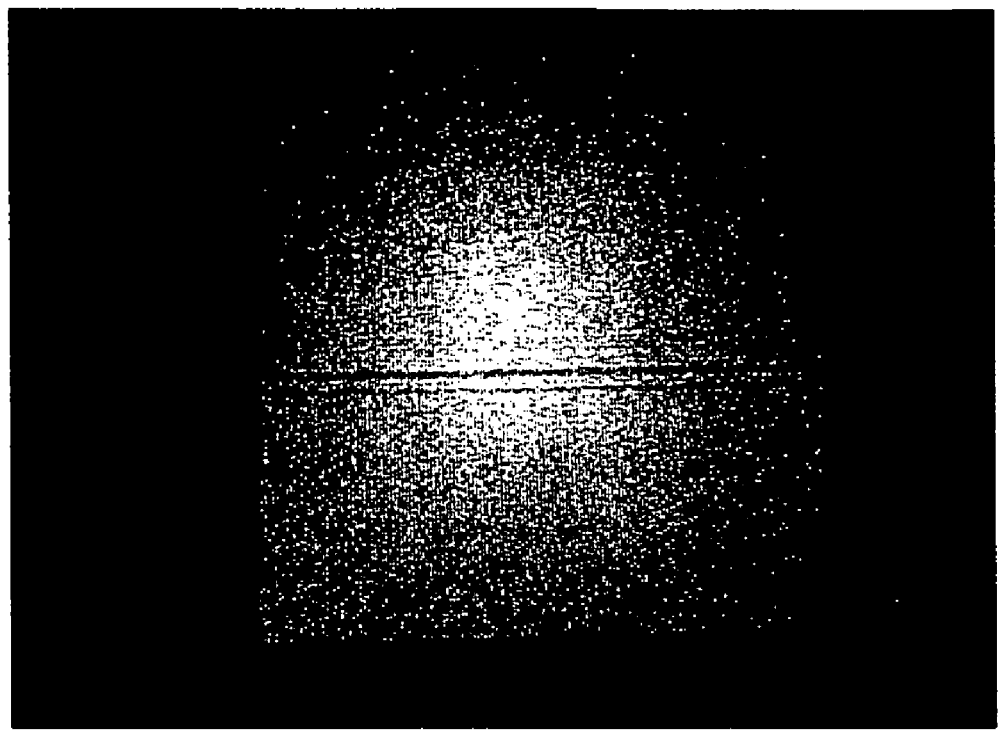
FIG. 14 illustrates a field emission image of a sample activated by a foam sheet-covered laminating process.

Referring to FIG. 13, compared with an electric field of 2.14 V/micron at 120 mA for the taping process, that of the foam sheet covered laminating process was much lower (1.42 V/micron at 120 mA, more than 30% lower). FIG. 14 is the field emission image of the sample activated by the foam sheet-covered laminating process (120 mA, 1.42 V/micron).

Although the present invention and its advantages have been described in detail, it should be understood that various changes, substitutions and alterations can be made herein without departing from the spirit and scope of the invention as defined by the appended claims.

We claim:

1. A method of improved electron field emission from a field emission cathode containing a layer of carbon nanotubes, said method comprising the steps of:
   depositing said CNT layer onto a substrate;
   pressing a non-adhesive material in contact with the CNT layer; and removing the non-adhesive material from contact with the CNT layer.

2. The method of claim 1, wherein the non-adhesive material is either flexible or non-flexible material such as elastic foam sheet, paper, metal, ceramic or glass plate.

3. The method of claim 1, wherein the carbon nanotubes are selected from the group of single-wall carbon nanotubes, double-wall carbon nanotubes, multi-wall carbon nanotubes, buckytubes, carbon fibrils, chemically-modified carbon nanotubes, derivatized carbon nanotubes, metallic carbon nanotubes, semiconducting carbon nanotubes, metallized carbon nanotubes, and combinations thereof.

4. The method of claim 1, wherein the carbon nanotubes include mixed particles selected from the group of spherical particles, dish-shaped particles, lamellar particles, rod-like particles, metal particles, semiconductor particles, polymeric particles, ceramic particles, dielectric particles, clay particles, fibers, nanparticles, and combinations thereof.

5. The method of claim 1, wherein the CNT layer is deposited by spray, screen-printing, spin-coating, dispersing, ink-jet printing, electrophoresis deposition, brushing, dipping, or other methods.

6. The method of claim 1, contains the said pressing process is performed by a laminating method.

7. The method of claim 1, further comprising the step of causing an emission electrons from the CNT layer.

* * * * *

UNITED STATES PATENT AND TRADEMARK OFFICE
CERTIFICATE OF CORRECTION

PATENT NO. : 7,462,498 B2
APPLICATION NO. : 11/156972
DATED : December 9, 2008
INVENTOR(S) : Dongsheng Mao It is certified that error appears in the above-identified patent and that said Letters Patent is hereby corrected as shown below:

Col. 7, line 4, delete "either" and insert --either a--.

Col. 8, line 4, delete "nanparticles" and insert --nanoparticles--.

Col. 8, line 9, delete "contains the" and insert --wherein--.

Col. 8, line 12, delete "emission" and insert --emission of--.

Signed and Sealed this

Eighth Day of December, 2009

David J. Kappos
*Director of the United States Patent and Trademark Office*